United States Patent

[11] 3,602,831

[72] Inventor George Alexandrovich
Commack, N.Y.

[21] Appl. No. 769,156

[22] Filed Oct. 21, 1968

[45] Patented Aug. 31, 1971

[73] Assignee Fairchild Sound Equipment

[54] EQUALIZER USING LIGHT DEPENDENT RESISTORS WITH FAIL-SAFE CIRCUITS

10 Claims, 5 Drawing Figs.

[52] U.S. Cl. .......... 330/59, 330/16

[51] Int. Cl. .......... H03f 17/00

[50] Field of Search .......... 330/59; 250/237 G, 208, 206, 215, 209, 214

[56] References Cited

UNITED STATES PATENTS

| | | | |
|---|---|---|---|
| 3,227,888 | 1/1966 | Shepherd et al. .......... | 250/237 |
| 3,268,815 | 8/1966 | Banach .......... | 330/59 X |
| 3,379,991 | 4/1968 | Clerc et al. .......... | 330/59 |

*Primary Examiner*—Nathan Kaufman

*Attorney*—Darby & Darby

ABSTRACT: An equalizer circuit for audio frequency signals in which a plurality of frequency responsive compensation networks each including a light-dependent resistor is provided for respectively producing low frequency boost, low frequency droop, high frequency boost and high frequency cut compensation. The light-dependent resistors are arranged in the compensating networks so that if the light source for any such resistor fails, the particular compensation network will have little or no effect so that the response curve of the equalizer will tend to go flat.

Figure 1:
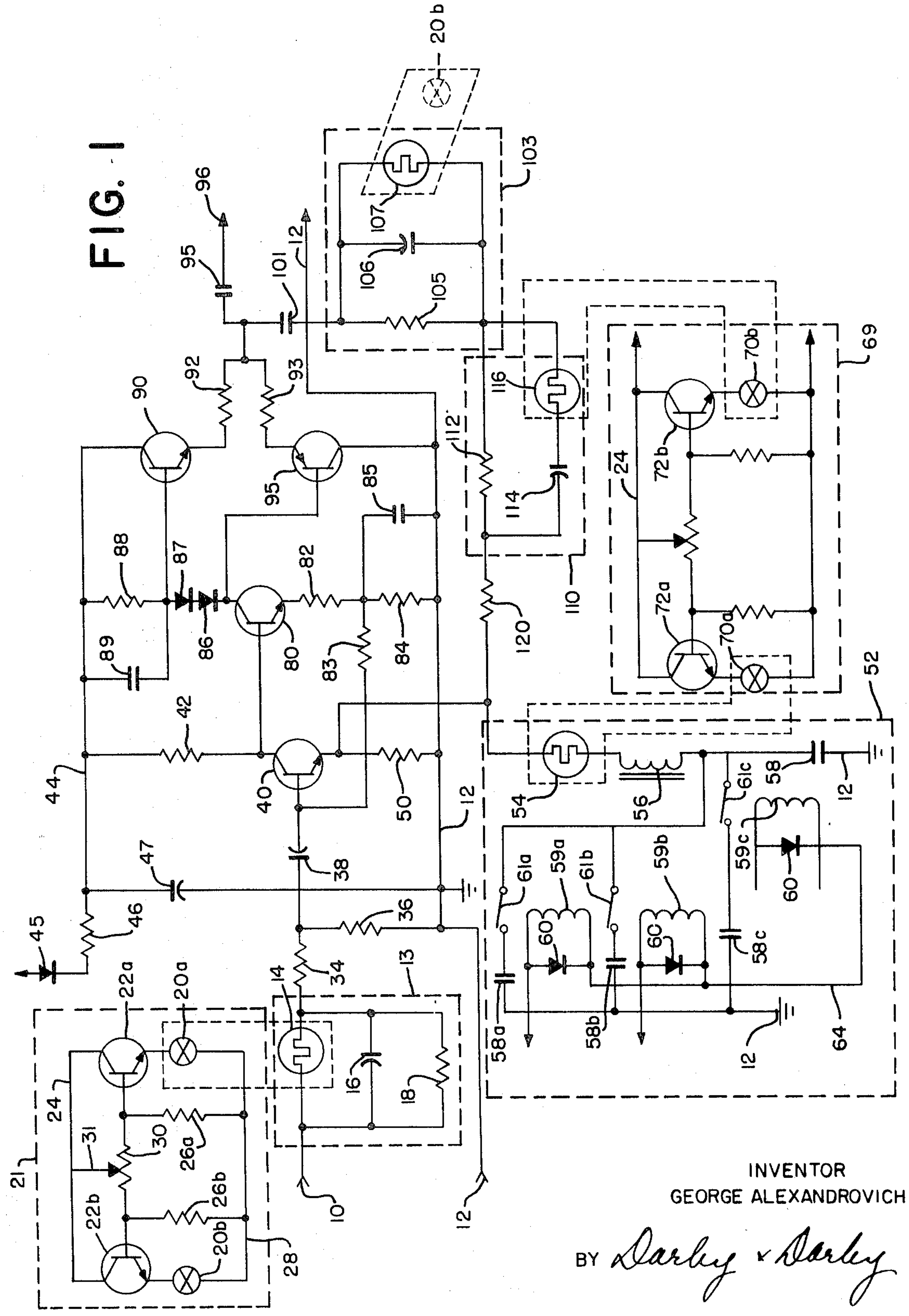

INVENTOR
GEORGE ALEXANDROVICH

BY Darby & Darby
ATTORNEYS

INVENTOR
GEORGE ALEXANDROVICH

BY Darby & Darby
ATTORNEYS

EQUALIZER USING LIGHT DEPENDENT RESISTORS WITH FAIL-SAFE CIRCUITS

This invention relates to equalizers for use with audiofrequency signals and more particularly to an equalizer circuit using light-dependent resistors. As is known, equalizer circuits are used in audiofrequency applications to modify an input audio signal so that a controlled response can be produced. Thus, such equalizer circuits usually contain frequency responsive compensation networks which modify some portion of the input audio signal, for example to boost and/or attenuate a selected range of the high frequency and/or low frequency portions of the input signal.

In accordance with the subject invention, an equalizer circuit is provided having four, frequency responsive, compensating networks each of which has a light-dependent resistor. Each light-dependent resistor is illuminated with light from a separate source, the source being a lamp which is driven by a suitable variably controlled device such as a transistor.

The four compensating networks are arranged in the equalizer circuit to provide the following compensations: low frequency boost, which is a boost in amplification of a selected range of frequencies at the low frequency end of the input signal; low frequency droop, which is an attenuation of a selected range of frequencies at the low frequency end of the input signal; high frequency boost, which is a boost in amplification of a selected range of frequencies at the high frequency end of the input signal; and high frequency cut, which is an attenuation of a selected range of frequencies at the high frequency end of the input signal. The compensation networks for providing low frequency droop, high frequency cut and high frequency boost are connected in a negative feedback loop between the output of the equalizer and one of the equalizer's amplifier sections. The compensation networks for high frequency cut and high frequency boost operate together as a voltage divider to control the amount of high frequency negative feedback supplied to the amplifier section.

The lamps for each of the light dependent resistors of the equalizer circuit are individually controlled. Thus, the four compensating functions described above can be individually selected to a predetermined degree. In addition, the light-dependent resistors are connected in the equalizer circuit so that if the lamp of one circuit fails, the frequency-responsive compensation of the input signals normally provided by that network will become substantially ineffective so that the output response curve of the equalizer will go toward a flattened condition.

It is therefore an object of the subject invention to provide an equalizer circuit having a plurality of compensating networks for modifying the high and low frequency response characteristics of an input signal applied to the equalizer, each compensating network including a light-dependent resistor.

An additional object is to provide frequency compensating networks for an equalizer circuit including light-dependent resistors in which the failure of a lamp driving a respective light-dependent resistor will cause the response curve of the equalizer to go toward a flattened condition.

An additional object is to provide an equalizer circuit having compensating networks using light-dependent resistors to produce controllable low frequency boost, high frequency droop, high frequency cut and high frequency boost compensating functions, each of the light-dependent resistors being connected in a fail-safe arrangement so that if its light source fails, the response curve of the equalizer will tend to flatten.

Other objects and advantages of the present invention will become more apparent upon reference to the following specification and annexed drawings, in which:

FIG. 1 is a schematic diagram of the equalizer circuit and

FIGS. 2A–2D are graphs showing the response characteristics produced by the compensating networks. FIG. 1 shows the invention as applied to an equalizer circuit. Here, the input audiofrequency signal to be modified (equalized) is applied to input terminals 10 and 12, with terminal 12 serving as the reference potential point or common ground lead of the circuit. The input signal is generally in the range from 20 Hz. to 20 kHz. Connected in series with input terminal 10 is a low frequency boost network 13 formed by the parallel connection of a light-dependent resistor (LDR) 14, a capacitor 16 and a fixed-value resistor 18. The LDR 14, as are the other light-dependent resistors of the circuit described below, is of a suitable material, such as cadmium sulfide, which has a high resistance when no light is shining thereon and which lowers its resistance by an amount proportionate to the light from a separate source which illuminates it. Thus, the LDR 14 can have a very low value of resistance when receiving a sufficient quantity of light.

The resistance value of LDR 14 is controlled by a lamp **20*a* which is part of a control circuit 21. Lamp 20*a* is connected in the emitter circuit of a transistor 22*a* and another transistor 22*b* is provided having a lamp 20*b* in its emitter circuit. Both transistors 22*a* and 22*b* are of the same type and preferably have the same, or quite similar characteristics. They are shown as being of the NPN-type and have their collectors directly connected to a suitable source of positive potential 24 (not shown). The base electrode of each transistor is biased by a resistor 26*a* and 26*b* whose lower end is connected to a source of reference or negative potential 28 (not shown). Connected between the base electrode of the two transistors are the ends of a potentiometer 30 whose slider 31 is connected to the source of positive potential 24. Thus, by adjusting the position of the slider 31, the forward biasing potential applied to the base of one or the other of transistors 22*a* and 22*b*** is controlled.

The lamps 20 are each conventional incandescent lamps whose light output depends upon the amount of current passing through it. However, the circuit is such that only one lamp at a time is conducting. For example, if the slider 31 is set exactly at the middle of the potentiometer 30, both transistors are cut off and both lamps are dark. Moving the slider to one side or the other of center forward biases one transistor and causes it to conduct so that its connected lamp produces light. As a practical matter, for about 10° rotation of the slider of a potentiometer from its center, there is little or no change in the biasing of the two transistors. Therefore, a null or center setting is not critical. If desired, the base bias of transistors **22*a* and 22*b*** can be separately controlled by separate variable potentiometers or other suitable devices. This also applies to the other control circuit discussed below.

The low frequency boost circuit 13 is in series with the input signal and LDR 14 receives light from lamp **20*a*. Due to the presence of the capacitor 16, the impedance of network 13 increases in response to lower frequency signals so that it is essentially a high pass filter. Network 13 is part of a voltage divider including the resistors 34 and 36. Since LDR 14 is in parallel with the fixed value resistor 18 and capacitor 16, by operating the LDR 14 to lower its resistance, the high pass filter effect is diminished thereby providing low frequency boost. As should be apparent, by setting the control of the slider 31 and thereby controlling the conduction of transistor 22*a* and its lamp 20*a***, the amount of the low frequency boost can be controlled.

The two low frequency compensating networks 13 and 103 counteract each other striking a response balance which results in a flat frequency response for the output of the equalizer. Eliminating or reducing the filtering action of either of the networks by illuminating its respective LDR will boost or droop the low end response of the equalizer.

After being modified by the low frequency boost network 13, the input signal passes to a first transistor amplifier 40 through a divider network formed by fixed value resistors 34 and 36. A capacitor 38 is connected between the junction of the two resistors and the base of transistor 40. The collector of transistor 40 is returned through a resistor 42 to a B+ supply line 44 which receives B+ voltage through a positively poled diode 45 and a resistor 46. A capacitor 47 connected between the supply line 44 and the ground line 12 provides additional filtering. The emitter circuit of transistor 40 has a bypass resistor 50 connected between it and ground 12.

The output of transistor 40 is taken from its collector and applied to the base of a transistor 80 having series-connected emitter resistors 82 and 84, the latter of which is bypassed by a fixed capacitor 85. A temperature stabilization resistor 83 is connected between the base of transistor 40 and the junction of resistors 82 and 84. The collector of transistor 80 is returned to the B+ line 44 through a pair of series-connected diodes 86 and 87 and a parallel circuit of resistor 88 and a capacitor 89.

The lower end of resistor 88 is also connected to the base of an NPN transistor 90 to provide base bias for this transistor whose collector is connected directly to the B+ supply line 44. A pair of resistors 92 and 93 are connected in series between the emitter of transistor 90 and the emitter of a PNP transistor 95 whose collector is returned to the common line 12. The base of transistor 95 is supplied with the output signal from the collector of transistor 80 and the base of transistor 90 also receives this output signal. Thus, transistors 90 and 95 are connected in a push-pull output transformerless circuit.

The output signal on the amplifier circuit is taken off of the junction of transistors 92 and 93 across terminals 96 and 12 through a capacitor 195. The diodes 86 and 87 provide a bias shift for the two output transistors 90 and 95 to overcome crossover distortion produced by the nonlinearity of the characteristics of the two transistors near their cutoff points. The two transistors are operated as Class B amplifiers.

A feedback loop is provided between the output of the circuit and the emitter of transistor 40 to control the low frequency droop, the high frequency cut and the high frequency boost of the equalizer. The feedback signal is taken from the junction of the two emitter resistors 92 and 93 through a capacitor 101. A compensating network 103 is provided for controlling the low frequency droop. Compensating network 103 is formed by a parallel connected fixed value resistor 105, capacitor 106 and an LDR 107. The resistance of LDR 107 is controlled by lamp **20*b* of the control circuit 21. Network 103 is also of the high pass filter type. However, since it is in series in the feedback line, a lesser magnitude negative feedback signal is provided at lower frequencies than at higher frequencies. This means that the gain of amplifier 40 is increased at the low frequency end of the response curve. As the resistance of LDR 107 decreases in response to more light from lamp 20*b*, the high pass filtering action of the network 103** in the feedback line also decreases producing more of a negative feedback signal and decreased amplifier gain at lower frequencies.

The feedback signal from the compensation circuit 103 is passed to a high frequency cut compensation circuit 110. This circuit is formed by a fixed value resistor 112 to which is connected in parallel the series connection of a capacitor 114 and an LDR 116. The impedance of the capacitor decreases in response to signals of increasing frequency. LDR 116 receives its light from the lamp **70*b* of a control circuit 69. The control circuit 69 is similar to control circuit 21 described above and, therefore, the description thereof will not be repeated in detail. Again separate biasing controls can be used for each of the transistors. Since the compensation circuit 110 is in series in the feedback line and the capacitor 114 is in parallel with the fixed value resistor 112, as the frequency of the signal on the negative feedback line increases, the impedance of circuit 110 decreases. Decrease of the resistance value of LDR 116 further decreases the total impedance of network 110**. This provides increased negative feedback at higher frequencies and controls the high frequency point at which the equalizer begins to attenuate.

The feedback signal after being modified by networks 103 and 110 is applied through a resistor 120 to the emitter of the first transistor 40. Also connected to the emitter of this transistor is a high frequency boost compensating network 52. Network 52 forms a voltage divider with the high frequency cut network 110 in what amounts to an L-pad attenuation circuit formed by network 110, resistor 120 and network 52.

The high frequency boost compensation network 52 includes a series connection of an LDR 54, an inductor 56 and a fixed value capacitor 58. A number of other capacitors **58*a*, 58*b* AND 58*c* are provided which can be selectively connected, one or more at a time, in parallel with the fixed capacitor 58 thereby increasing the total capacitance in series with LDR 54 and inductor 56. The connection is made by actuation of a respective relay 59*a*, 59*b* and 59*c*, each of which has a transient suppressing diode 60 connected across its coil in the usual manner. The lower end of each of the relay coils 59, is connected to a point of positive potential shown by line 64. The switching circuit for selectively connecting the upper end of each relay coil 59 to ground to complete the circuit to energize the relay is not shown. Each relay has a respective contact 61 connected to the upper end of capacitor 58. One end of each of the capacitors 58*a*, 58*b* and 58*c* is connected to ground. When a relay is energized, its respective contact 6 is closed to make connection to the ungrounded end of the respective capacitor 58*a*, 58*b* or 58*c* and this capacitor is thereby connected in parallel with the fixed capacitor 58**.

The LDR 54 of the high frequency boost circuit receives light from a lamp **70*a* which is part of a control circuit 69. As the conduction through transistor 72*a* increases, the output of lamp 70*a* also increases, causing the resistance of LDR 54 to decrease. Since the inductor 56 and capacitor 58 are connected in series, they form a resonant network. The values of these two components can be selected to produce resonance at a selected frequency in the upper portion of the audiofrequency range where the impedance is nearly zero. The resonant frequency can be changed by switching in the additional capacitors 58*a*, 58*b* and 58*c***.

LDR 54 of network 52 acts as the lower leg of a voltage divider for the negative feedback signal applied to the emitter of transistor 54. As the resistance of LDR 54 increases, in response to decreasing light from source **70*a*, the network 52 has less effect since a greater magnitude feedback voltage is produced across it. This means that the amplifier receives more negative feedback voltage and its response curve is flatter. In response to a greater amount of light from lamp 70*a* the resistance of LDR 54 decreases so that the resonant circuit of inductor 56 and capacitor 58 operates as a trap to pass signals at the resonant frequency to ground. This produces less feedback for signals at the resonant frequency and greater amplification of the input signal at the resonant frequency. This produces a peak in the response curve at the high frequency end. The peak can be flattened by decreasing the light output of lamp 70*a* (increasing the resistance of LDR 54) and the position of the peak changed by using the capacitors 58*a*, 58*b* and 58*c***.

As should be apparent, in any equalizer circuit only one type of compensation is applied to the high frequency and/or low frequency end of the response curve at any time. Thus, the equalizer will have either high frequency cut or boost, but not both. At the same time it can have either low frequency boost or droop, but not both.

Figure 2A:
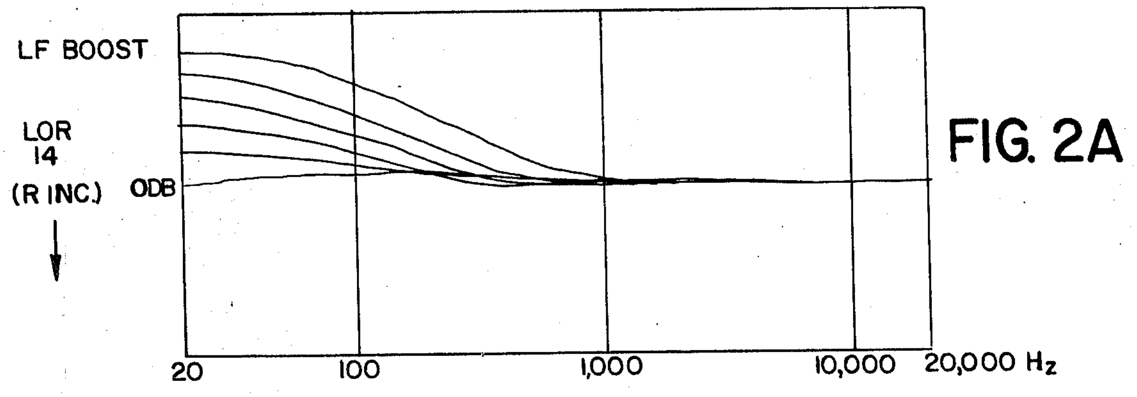
Figure 2B:
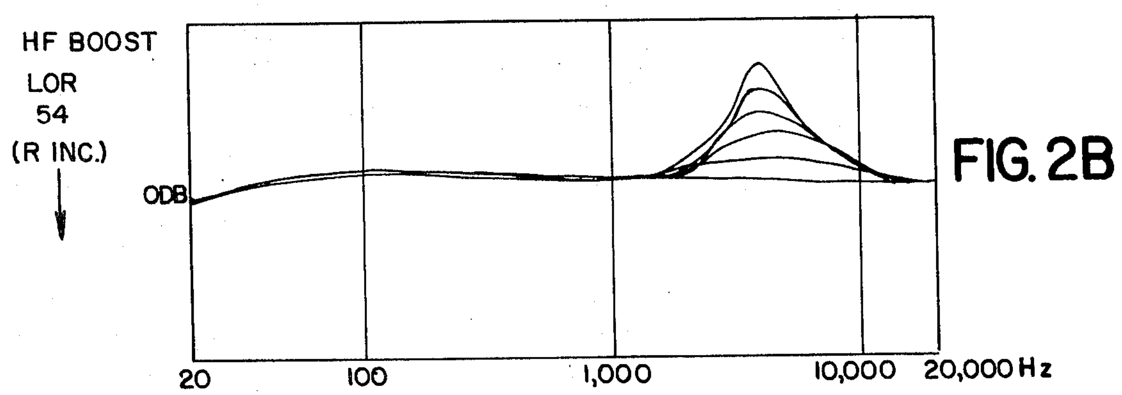

FIGS. 2A–2D are graphs showing the responses of the equalizer circuit for the various compensation networks including the respective LDRs 14, 54, 167 and 116 for different resistance values of these LDRs. The curves are all shown on a semilog plot with a frequency range of 20 Hz. to 20 kHz. The flat reference line is 0 db. In FIG. 2A, the effect of the low frequency boost network 13 is shown on the equalizer output for varying values of LDR 14. As seen, as the value of LDR 14 increases (going down on the Y axis of the graph) the low frequency end of the curve becomes flatter. In FIG. 2B the effect of the high frequency boost network 53 is shown and it is seen that for an increase in the resistance value (going down on the Y axis) the peaked portion of the curve, produced by the resonant circuit 56, 58, is flattened out as LDR 54 goes toward maximum value. In this case, the values of inductor 56 and capacitor 58 are left fixed for the varying resistance values of LDR 54. The peaked portion of the curve can be shifted to a higher or lower frequency by adding and removing capacitance from the resonant circuit.

Figure 2C:
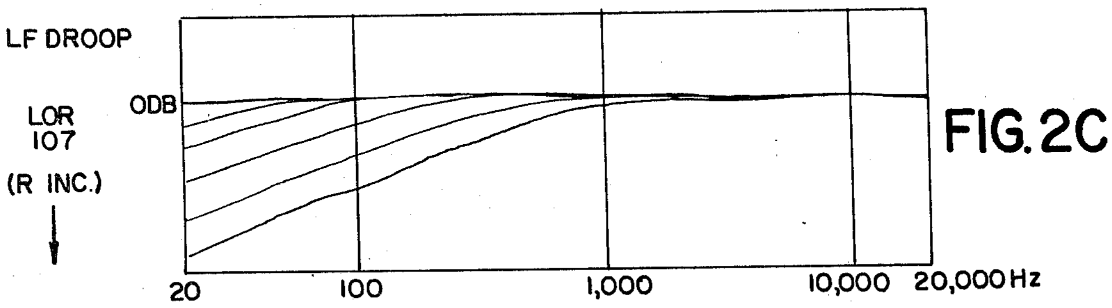
Figure 2D:
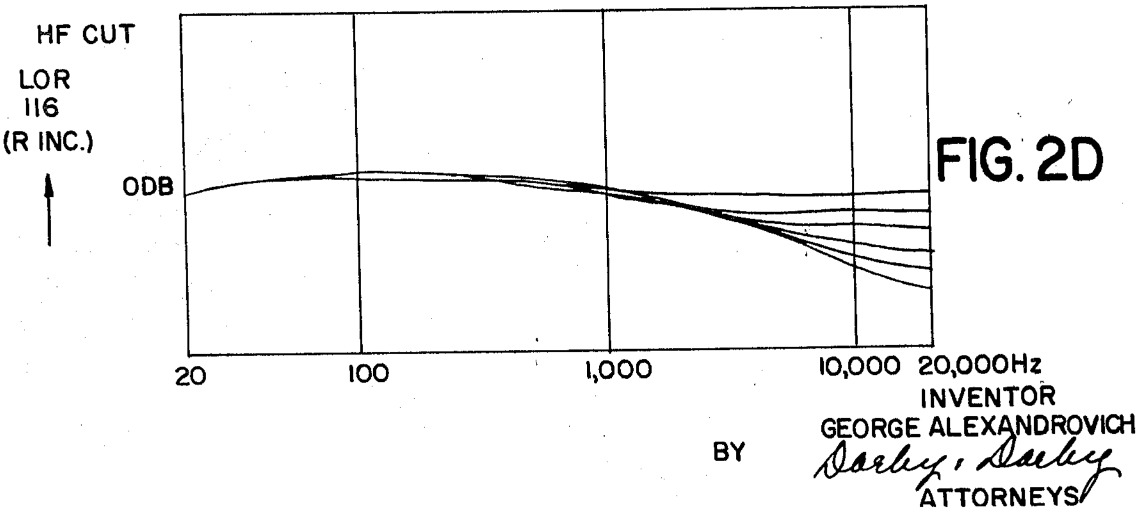

FIG. 2C shows the effect of the low frequency droop network as the resistance value of LDR 107 is changed. As can be seen, as the resistance of LDR 107 increases (going down on the Y axis) the output signal of the equalizer is attenuated more at the low frequency end. In FIG. 2D the effect of the high frequency cut network 110 is shown. As the resistance value of LDR 116 increases (going up on the Y axis) the high frequency end of the curve of the equalizer output signal gets flatter. Conversely, as the resistance value of LDR decreases (down on the Y axis) more attenuation is added at the high frequency end of the curve.

The fail-safe feature of the invention can be best appreciated by referring to FIGS. 2A–2D. As any of the lamps controlling a respective LDR goes out, due to lamp burnout or transistor malfunction, the resistance of the LDR goes up to a maximum value. Thus, as seen in each of FIGS. 2A–2D, the response curve flattens. This means that the frequency compensation network whose lamp went out does not modify the output response curve of the equalizer. This, of course, is desirable since the equalizer will at least reproduce the input signal rather than modify it in some undesired uncontrolled manner. Further, loss of a particular type of compensation becomes easier to spot and repair.

As should be apparent, the equalizer circuit of the present invention is relatively simple in its construction and operates efficiently. Further, since LDRs are used in the various compensation networks they can be controlled remotely in a substantially noise-free manner. For example, the potentiometer for a control transistor can be located on a master control panel and the lamp that it drives at some other place with the remainder of the equalizer circuit. There is no noise pickup in the lamp voltage lines since these do not carry the signal.

While a preferred embodiment of the invention has been described above, it will be understood that this embodiment is illustrative only and the invention is to be limited solely by the appended claims.

What is claimed is:

1. An equalizer circuit having an input and output said circuit operating to modify the amplitude of an electrical signal in the audio frequency range applied to the input of said equalizer circuit and comprising at least one amplifier means located between said equalizer circuit input and output, a plurality of frequency responsive compensating networks each for modifying the amplitude of a selected range of frequencies of said electrical signal, each of said networks including at least one reactive circuit element means whose impedance varies in response to the frequency of the signal applied thereto and a light-dependent resistor means connected in circuit with said reactive circuit element means whose resistance varies in accordance with the amount of light impinging thereon, a light source for each of said compensating networks located to impinge its light upon the corresponding light-dependent resistor means of a respective network, means independent of the electrical signal processed by said equalizer circuit for controlling the intensity of the light produced by each of said light sources to thereby control the resistance of the corresponding light-dependent resistor means associated with a respective light source and the attenuation characteristics of the respective network in which said light-dependent resistor means is located, means for electrically connecting the light-dependent resistor means of each said network in circuit with an impedance element means of the respective network so that when said light-dependent resistor means has maximum resistance in the absence of light from its respective light source shining thereon the attenuation characteristic of each said network has minimum frequency responsive effect on the amplitude of the electrical signal being modified by said equalizer circuit and a correspondingly greater effect as the intensity of the light increases, means for connecting a first one of said compensating network means between the input of the equalizer circuit and the input of said amplifier means to provide low frequency boost compensation for said electrical signal, and means for connecting a second, a third and a fourth compensating network means in the feedback signal path between the output and the input of said amplifier means to provide low frequency droop, high frequency cut and high frequency boost compensation respectively for said electrical signal.

2. An equalizer circuit as in claim 1 wherein the reactive circuit element means of said first compensating network comprises a capacitor connected in parallel with the light-dependent resistor means.

3. An equalizer circuit as in claim 1 wherein said second compensating network means in the feedback signal path attenuates a selected high frequency range of signals and whose reactive circuit element means comprises a capacitor connected in series with the light-dependent resistor means of said second compensating network, both said capacitor and said light-dependent resistor connected in series in the feedback signal path to produce a greater magnitude negative feedback signal at said selected high frequency range which is applied to the input of said amplifier means.

4. An equalizer circuit as in claim 1 further comprising means connecting said third and said fourth compensating network means in a voltage divider arrangement, means connecting the junction of the voltage divider to said amplifier means, the reactive circuit element means of said fourth compensating network means including a series resonant circuit connected between said amplifier means and a point of reference potential with the light-dependent resistor of said fourth compensating network being connected in series with the resonant circuit.

5. An equalizer circuit as in claim 4 wherein said third compensating network means in the feedback signal path attenuates a selected high frequency range of signals and whose reactive circuit element means comprises a capacitor connected in series with the light-dependent resistor means of said third compensating network means, both said capacitor and said light-dependent resistor connected in series in the feedback signal path to produce a greater magnitude negative feedback signal at said selected high frequency range which is applied to the input of said amplifier means.

6. An equalizer network as in claim 1 wherein the reactive circuit element means of said second compensating network comprises a capacitor, means connecting said capacitor in parallel with the light-dependent resistor means of said network to provide the low frequency droop.

7. An equalizer circuit as in claim 6 further comprising means connecting said third and said fourth compensating networks in a voltage divider arrangement, means connecting the junction of voltage divider to said amplifier means, the reactive circuit element means of said fourth compensating network means including a series-resonant circuit connected between said amplifier means and a point of reference potential, and means connecting the light-dependent resistor of said fourth network in series with the reactive circuit element means of said fourth compensating network.

8. An equalizer circuit as in claim 7 wherein said third compensating network means in the feedback signal path attenuates a selected high frequency range of said electrical signal, the reactive circuit element means of said third compensating network comprising a capacitor, means for connecting said capacitor in series with the light-dependent resistor means of said third compensating network means, both said capacitor and said light dependent resistor connected in series in the feedback signal path to produce a greater magnitude negative feedback signal at the selected high frequency range which is applied to the input of said amplifier.

9. An equalizer circuit as in claim 1 wherein said means for controlling the intensity of the light produced by said light sources comprises a first differentially operated means which controls the light sources of said first and second compensating network means so that as the intensity of the light produced by one source increases the intensity of the light produced by the other source decreases.

10. An equalizer circuit as in claim 1 wherein said means for controlling the intensity of the light produced by said light sources comprises a second differentially operated means which controls the light sources of said third and fourth compensating network means so that as the intensity of the light produced by one source increases the intensity of the light produced by the other source decreases.